United States Patent
Lelong

(10) Patent No.: US 6,461,121 B1
(45) Date of Patent: Oct. 8, 2002

(54) MONODIRECTIONAL DOUBLE OUTLET PUMP, AND A SYSTEM AND METHOD FOR WASHING AUTOMOBILE SURFACES

(75) Inventor: Reynald Lelong, Saint Mammes (FR)

(73) Assignee: Societe d'Etudes et de Realisations Industrielles et Commerciales "Seric", Le Chatelet en Brie (FR)

( * ) Notice: Subject to any disclaimer, the term of this patent is extended or adjusted under 35 U.S.C. 154(b) by 0 days.

(21) Appl. No.: 09/349,282

(22) Filed: Jul. 8, 1999

(51) Int. Cl.[7] .......................... F04B 17/00; F04B 35/04; B05B 1/10; B60S 1/46
(52) U.S. Cl. .................. 417/423.1; 417/423.11; 417/410.3; 239/284.1
(58) Field of Search .................. 417/423.1, 410.3, 417/423.11; 239/284.1, 284.2

(56) References Cited

U.S. PATENT DOCUMENTS

| | | | | |
|---|---|---|---|---|
| 3,316,847 A | * | 5/1967 | Mandy et al. | 103/87 |
| 3,667,870 A | * | 6/1972 | Yoshida et al. | 417/357 |
| 4,210,283 A | * | 7/1980 | Stouffer et al. | 239/11 |
| 4,331,295 A | * | 5/1982 | Warihashi | 239/284 R |
| 4,728,260 A | * | 3/1988 | Ishii | 415/152 |
| 4,838,488 A | * | 6/1989 | Heier et al. | 239/284.1 |
| 4,874,298 A | * | 10/1989 | Mainardi et al. | 417/315 |
| 4,900,235 A | * | 2/1990 | Perkins et al. | 417/315 |
| 4,919,591 A | * | 4/1990 | Kamimura et al. | 415/152.1 |
| 6,296,198 B1 | * | 10/2001 | Tores | 239/284.1 |

FOREIGN PATENT DOCUMENTS

| | | | | |
|---|---|---|---|---|
| FR | 1.239.757 | * | 7/1960 | |
| FR | 2.210.235 | * | 5/1974 | F04D/29/42 |

* cited by examiner

Primary Examiner—Charles G. Freay
Assistant Examiner—Timothy P. Solak
(74) Attorney, Agent, or Firm—Nawrocki, Rooney & Sivertson, P.A.

(57) ABSTRACT

The present invention provides a monodirectional pump comprising a body within which is accommodated a motor which activates a bladed rotor, the pump comprising an inlet opening for liquid and two outlet tips allowing for release of the liquid sucked by the pump through the two outlet tips simultaneously. The present invention also provides the uses of the pump, particularly in a system for washing surfaces, for example automobile windows and/or headlights.

18 Claims, 2 Drawing Sheets

MONODIRECTIONAL DOUBLE OUTLET PUMP, AND A SYSTEM AND METHOD FOR WASHING AUTOMOBILE SURFACES

BACKGROUND OF THE INVENTION

The invention relates to a monodirectional double outlet pump.

It also relates to the uses for this pump, particularly in a system for washing surfaces of automobiles which include such a pump.

The surface washing systems mounted on automobiles generally have a monodirectional single outlet pump.

This type of pump typically comprises a direct current motor to be connected to the battery of an accumulator and having a pivoting axial outlet shaft at the end of which is mounted, wedged angularly, a bladed rotor.

Such a pump may be integrated, for example, in a windshield washer system for automobiles comprising a washing liquid reservoir arranged so that the washing liquid in the reservoir is sucked by the pump when it is operating.

The pump includes an outlet which is linked to a tube equipped with a side outlet system, for example a T- or Y-shaped fitting, making it possible to separate the washing liquid discharged from the pump into several, usually two, jets.

The jets of washing liquid are then directed by way of secondary tubes towards downstream circuits such as a spray nozzle attached to body or to the windshield wiper itself.

It would be desirable to eliminate the T- and Y-shaped fittings used to separate the washing liquid discharged from the pump into several jets.

This is in particular to avoid the phenomenon of charge loss which can appear in one of the secondary tubes, and also to avoid problems of water-tightness at the linkages.

SUMMARY OF THE INVENTION

The invention aims to solve this problem by providing a monodirectional double outlet pump which could discharge liquid from both outlets simultaneously with approximately the same outflow.

The double outlet pump, according to the invention, comprises a body which forms a support and protection within which a motor is accommodated and equipped with a pivoting axial output shaft.

A bladed rotor is mounted, at the end of the output shaft.

According to the invention, a case defines a hydraulic chamber in which the rotor is accommodated. The hydraulic chamber has an axial inlet communicating with the opening of the pump inlet and which has at least one lateral and tangential outlet prolonged by at least one outlet duct.

The outlet duct is in communication with the means distributing the liquid discharged by the rotor, the means of distribution communicating with two outlets fitted with the two outlet tips.

According to the embodiment, the means distributing the washing liquid comprise a distribution chamber.

It would be possible to have only one pump outlet connected to a distribution chamber having two outlets. As a variant, the pump can include two outlets prolonged by two outlet ducts.

The invention also aims to protect the uses of the pump as described above, for the distribution of liquid, particularly washing liquid, on automobile surfaces, e.g. for washing the automobile windows and/or headlights.

The invention also aims to protect a system for washing automobile surfaces.

Such a system for washing automobile surfaces, for example washing windows and/or headlights, comprises a washing liquid reservoir, a washing liquid distribution pump such as described, linked to the washing liquid reservoir, two tubes connected to the pump outlet tips and at the outlet of which spray nozzles are mounted.

The invention will be better understood when reading the following description with reference to the appended drawings.

DETAILED DESCRIPTION OF THE INVENTION

Figure 1:
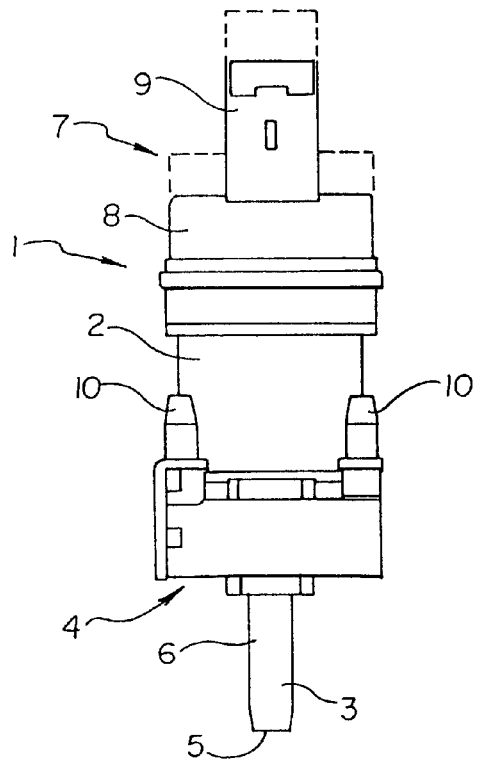
FIG. 1 is a front schematic representation, of an embodiment of the pump operation according to the invention.
Figure 2:
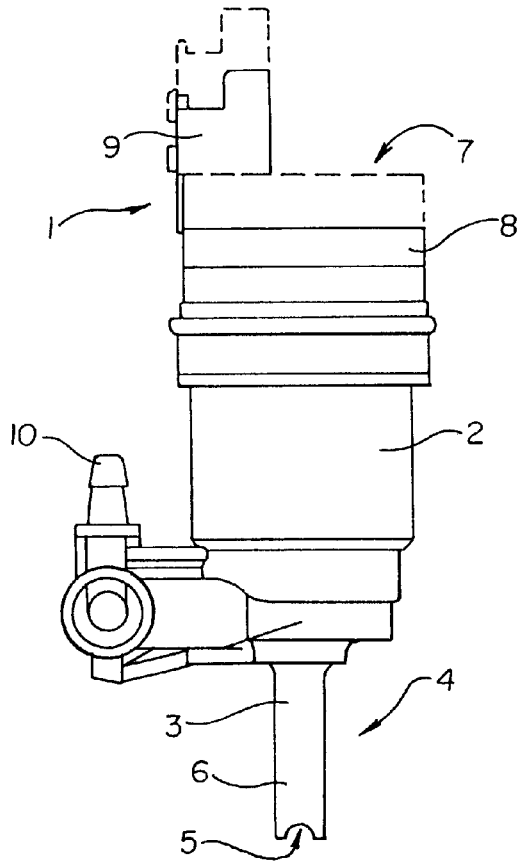
FIG. 2 is a side schematic representation of the pump shown in FIG. 1.

Referring to FIGS. 1 and 2, the pump 1 according to the invention comprises a body 2 which acts as an envelope to provide support and protection.

In the description, the following definition is given for the geometry of the described parts:

Axial direction: this is the direction parallel to the axis 3, which is the rotor pivoting axis.

The pump 1 is equipped at its lower end part 4 with an inlet opening 5 arranged at the end part of a duct 6, allowing for the supply of the pump 1 with liquid.

The inlet opening 5 is linked directly or by way of a tube to a reservoir (not shown) which contains liquid.

The pump 1 is equipped at its upper end part 7 with a protective housing 8.

The pump 1 includes an electrical connector 9 located on the protective housing 8 comprising plugs which allow for connection to a battery of accumulators.

The pump 1 also comprises two outlet tips 10 the longitudinal of which axes are substantially parallel to the axis 3.

The longitudinal axes of the outlets 10 need not be parallel to this axis 3. They can, for example, be substantially perpendicular to the axis 3 or in an intermediate position.

When the pump 1 is activated, the liquid is sucked through the inlet opening 5 then discharged by the pump 1 to the outlet tips 10 and from there to the downstream circuits.

Figure 3:
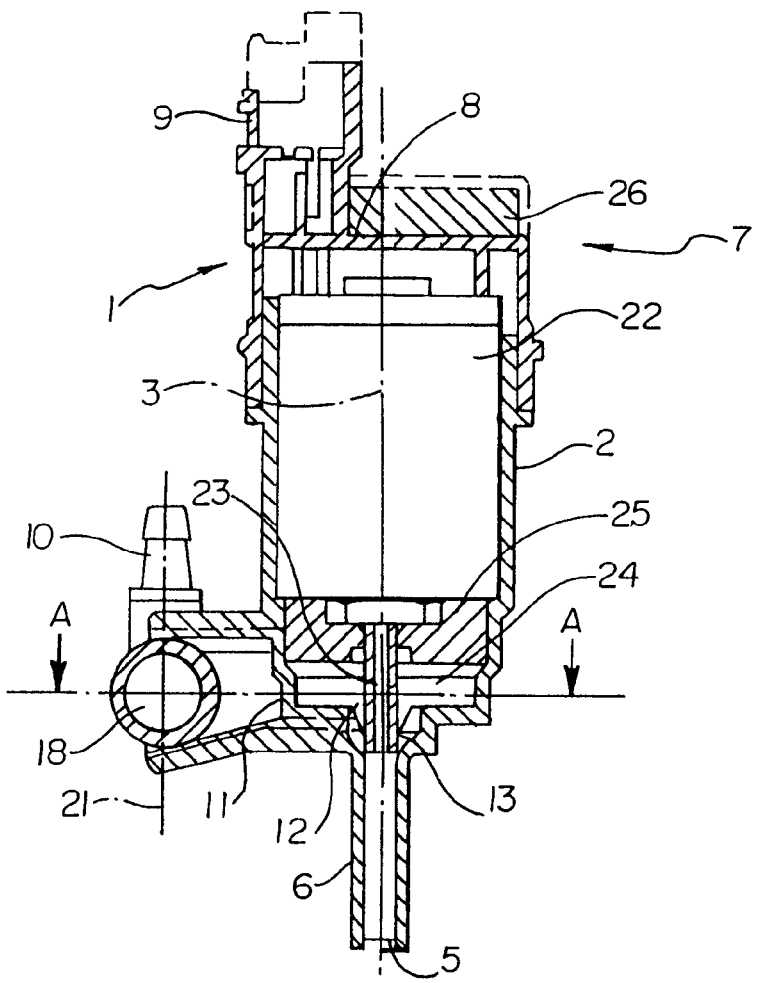
FIG. 3 is a schematic longitudinal axial section view of the pump shown in FIG. 1.
Figure 4:
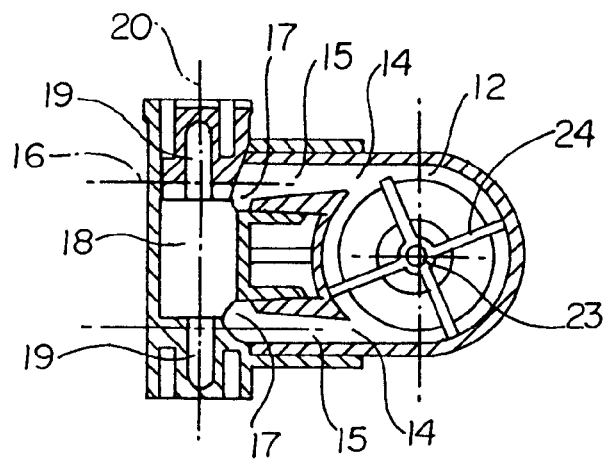
FIG. 4 is a top section view, following line AA, of the pump shown in FIG. 3.

Referring now to FIGS. 3 and 4, the pump 1 comprises a case 11 made of one or several parts, having a more or less complex shape, which defines a hydraulic chamber 12 with an axial inlet 13.

The inlet 13 is in communication with the inlet opening 5 of the pump 1.

On the schematic representation in FIG. 3, the inlet 13 is intentionally shown with dimensions greater than the real ones for the sake of clarity.

The hydraulic chamber 12 has two lateral and tangential outlets orifices 14, prolonged by two outlet ducts 15.

In the embodiment shown, the longitudinal axes 16 of the two outlet ducts 15 are substantially parallel to each other. Other embodiments are of course possible.

Similarly, the pump 1 shown includes two outlets 14 prolonged by two outlet ducts 15. There could however be only one outlet 14 prolonged by a single outlet duct 15.

The outlets 14 are in communication with the inlet 13 of the pump 1.

The end parts 17 of the outlet ducts 15 lead to the means distributing the liquid discharged by the pump 1 comprising a distribution chamber 18.

The distribution chamber 18 is equipped with two outlet openings 19 in communication with the outlet tips 10.

In the embodiment shown, the two longitudinal axes 20 of the two outlet openings 19 are substantially interchangeable and perpendicular to the longitudinal axes 21 of the outlet tips 10.

According to one embodiment, the distribution chamber 18 occupies a volume of the order of 1 to 3 cm$^3$.

For example, the chamber can have a diameter of 10 mm and a length of 16.5 mm.

The cross section of the outlet ducts 15 is chosen so as to be substantially equal to or greater than the cross section of the outlets 19. This difference in section is not critical in itself however.

For example, the cross section of the outlet ducts 15 is of the order of 10 mm$^2$, and the cross section of the outlets 19 is of the order of 9 mm$^2$.

A motor 22 is accommodated in the body 2 and is equipped with a pivoting axial outlet shaft 23. At the end of the shaft 23 located in the chamber 12, a bladed rotor 24 is mounted, and angularly wedged.

The rotor 24 is accommodated in the hydraulic chamber 12 with the necessary play for it to rotate around the axis 3, the distance between them being such that the rotating of the bladed rotor 24 triggers circumferential circulation of the liquid in the hydraulic chamber 12, the inlet 13 and the outlet 14.

The hydraulic chamber 12 is closed by an axial joint 25, placed in the body 2 between the motor 22 and the rotor 24, the motor 22 outlet shaft 23 passing through the joint 25 in a sufficiently liquid-tight way.

When the pump 1 is activated, the liquid is sucked through the inlet opening 5, goes up the duct 6, and then goes into the hydraulic chamber 12 through the inlet 13.

The rotation of the rotor 24 blades triggers the discharge of liquid through the two outlets 14 and from there through the two outlet ducts 15.

The liquid then arrives in the distribution chamber 18 which it fills at least partially and is simultaneously expelled through the two outlet openings 19 and the two outlet tips 10, with an acceptable difference in outflow between the two outlets 10, at standard pressures.

According to one embodiment, the pump 1 according to the invention operates at relatively low pressures of the order of $1.10^5$ to $3.10^5$ Pascals.

An interference suppression system 26 can be provided in the protecting housing 8 to improve the operation of the pump 1 when used in automobiles.

According to the embodiment, the body 2 of the pump 1 is monobloc, alternatively it can be composed of several parts, locked together for example.

The pump 1 can also be equipped with a sound insulation system (not shown).

The pump 1 according to the invention can be made of various materials. The body 2, the outlets 10, and the protective housing 8 for example, are made of a plastic material such as polypropylene or polyamide.

The joint 25 can be made from EPDM (ethylene-propylene-diene-monomer) rubber.

The pump 1, as described above, can be applied to systems for washing surfaces such as the windows and/or headlights of automobiles.

Other uses beyond automobiles can be imagined, whenever a sucked liquid is to be distributed from a reservoir and discharged by a pump through two outlets simultaneously.

What is claimed is:

1. A monodirectional double outlet pump comprising a body which provides support and protection: a motor accommodated in the body and equipped with an axial shaft at the end of which a bladed rotor is mounted, a case which defines a hydraulic chamber in which the rotor is accommodated, the hydraulic chamber having an inlet opening in the pump and an axial inlet in communication with the inlet opening and having at least one lateral and tangential outlet prolonged by at least one outlet duct, characterized in that the outlet duct is in communication with means integral with the pump for distributing the liquid discharged by the rotor, the means having two outlet openings communicating with two outlet tips, characterized in that longitudinal axes of the two outlet openings are substantially interchangeable and perpendicular to the longitudinal axes of the outlet tips, the distribution means being arranged to communicate a generally even flow of fluid simultaneously to each of the two outlet tips via the two outlet openings with approximately the same outflow.

2. A pump according to claim 1, characterized in that the means distributing the liquid include a distribution chamber.

3. A pump according to claim 1, characterized in that it includes two outlets prolonged by two outlet ducts.

4. A pump according to claim 1, characterized in that the cross section of the outlet ducts is substantially equal to or greater than the cross section of the outlet openings.

5. A pump according to claim 1, characterized in that the longitudinal axes of the two outlet tips are substantially parallel to the pivoting axis of the rotor.

6. A pump according to claim 1, characterized in that the longitudinal axes of the two outlet ducts are substantially parallel to each other.

7. A pump according to claim 1, characterized in that the distribution chamber occupies a volume of the order of 1 to 3 cm$^3$.

8. A pump according to claim 1, characterized in that it operates at relatively low pressures, of the order of $1.10^5$ to $3.10^5$ Pascals.

9. A pump according to claim 1, characterized in that the hydraulic chamber is closed by an axial joint, placed in the body between the motor and the rotor, the motor outlet shaft passing through the joint in a sufficiently liquid-tight way.

10. A pump according to claim 1, characterized in that the body is monobloc.

11. A pump according to claim 1, characterized in that the body is made of several parts.

12. The pump according to claim 2, wherein said distribution chamber provides fluid to both of said two outlet tips via said outlet openings.

13. The pump according to claim 1, wherein said distribution means simultaneously provides substantially equal amounts of fluid to each of said outlet tips.

14. The pump according to claim 1, wherein said distribution means has a fixed configuration.

15. A pump having an inlet and at least one outlet and wherein said outlet is connected to a distribution chamber that communicates a generally even flow of fluid simultaneously to each of two outlets each having an outlet tip characterized in that longitudinal axes of the two outlet openings are substantially interchangeable and perpendicular to the longitudinal axes of the outlet tips and wherein said inlet is in liquid communication with a washing liquid reservoir, for distribution of liquid on automobile surfaces, wherein said pump is positioned on an automobile and arranged to wash a specified area of an automobile surface.

16. The pump according to claim 15, wherein the specified area of said automobile surface is a window.

17. The pump according to claim 15, wherein the specified area of said automobile surface is a headlight.

18. A system for washing automobile surfaces, comprising a washing liquid reservoir, a washing liquid distribution pump having an inlet and at least one outlet and wherein said outlet is connected to a distribution chamber that communicates a generally even flow of fluid simultaneously to each of two outlets each having an outlet tip characterized in that longitudinal axes of the two outlet openings are substantially interchangeable and perpendicular to the longitudinal axes of the outlet tips and wherein said inlet is in liquid communication with the washing liquid reservoir, two tubes connected to the outlet tips of the pump and at the outlet of which the spray nozzles are mounted.

* * * * *